(12) United States Patent
Moorman et al.

(10) Patent No.: US 6,595,340 B2
(45) Date of Patent: Jul. 22, 2003

(54) CHARGING SYSTEM FOR A ROTATING CLUTCH ASSEMBLY

(75) Inventors: Steven Patrick Moorman, Dexter, MI (US); Joel H. Gunderson, Westland, MI (US); Brian W. Whitmarsh, Belleville, MI (US)

(73) Assignee: General Motors Corporation, Detroit, MI (US)

( * ) Notice: Subject to any disclaimer, the term of this patent is extended or adjusted under 35 U.S.C. 154(b) by 28 days.

(21) Appl. No.: 10/025,314

(22) Filed: Dec. 19, 2001

(65) Prior Publication Data

US 2003/0111314 A1 Jun. 19, 2003

(51) Int. Cl.$^7$ .......................................... F16D 25/0638
(52) U.S. Cl. ............................... 192/85 AA; 192/106 F
(58) Field of Search .......................... 192/85 R, 85 AA, 192/106 F

(56) References Cited

U.S. PATENT DOCUMENTS

| 3,217,851 A | * 11/1965 | Mogk et al. ............ 192/85 AA |
| 3,581,858 A | * 6/1971 | Haley ...................... 192/106 F |
| 4,023,444 A | 5/1977 | Murakami ................... 74/868 |
| 4,697,479 A | 10/1987 | Hayakawa et al. ........... 74/867 |
| 4,854,195 A | 8/1989 | Moroto et al. ................ 74/867 |
| 4,856,381 A | 8/1989 | Funahashi et al. ............ 74/867 |
| 5,172,799 A | 12/1992 | Iijima et al. ................. 192/106 |
| 5,205,192 A | 4/1993 | Ohashi et al. ................ 74/867 |
| 5,259,489 A | 11/1993 | Kimura et al. .......... 192/85 AA |
| 5,399,131 A | 3/1995 | Kamada et al. ............. 477/150 |
| 5,647,467 A | 7/1997 | Yamauchi ................. 192/87.11 |
| 5,720,374 A | * 2/1998 | Dadel et al. .............. 192/85 R |
| 5,950,787 A | 9/1999 | Murasugi et al. ....... 192/85 AA |
| 6,021,879 A | 2/2000 | Pelouch ................... 192/106 F |
| 6,146,311 A | 11/2000 | Moorman ................... 477/150 |
| 6,162,147 A | 12/2000 | Moorman ................... 477/150 |
| 6,223,592 B1 | 5/2001 | Genise ....................... 74/118.1 |

FOREIGN PATENT DOCUMENTS

JP          5-141447 A  *  6/1993  ............. 192/106 F

* cited by examiner

Primary Examiner—Richard M. Lorence
(74) Attorney, Agent, or Firm—Leslie C. Hodges

(57) ABSTRACT

A clutch assembly and charging system combination for use with an automatic transmission includes a clutch assembly having a clutch that is movable between a clutch engaged position and a clutch disengaged position. The clutch assembly further includes a clutch piston that is engageable with the clutch for urging the clutch toward the clutch engaged position, a clutch piston chamber in fluid communication with one side of the clutch piston, and a compensator chamber in fluid communication with an opposite side of the clutch piston. The combination further includes a charging system having a fluid circuit that is in fluid communication with the clutch piston chamber and the compensator chamber. The fluid circuit is configured to receive exhaust oil from the transmission, and to charge the clutch piston chamber and the compensator chamber using the exhaust oil.

15 Claims, 4 Drawing Sheets

CHARGING SYSTEM FOR A ROTATING CLUTCH ASSEMBLY

TECHNICAL FIELD

The invention relates to a charging system for charging chambers of a rotating clutch assembly.

BACKGROUND OF THE INVENTION

Many automatic transmissions for motor vehicles use rotating clutch assemblies to control gear ratio changes. A typical clutch assembly includes a clutch pack or clutch having multiple plates, and the clutch is moveable between a clutch disengaged position and a clutch engaged position in which the plates are frictionally engaged with each other. The assembly further includes a housing and a clutch piston disposed in the housing and engageable with the clutch for urging the clutch toward the clutch engaged position. The housing and clutch piston cooperate to define a clutch apply chamber or clutch chamber, which is filled with pressurized fluid when the clutch is to be moved to the clutch engaged position.

When the clutch moves back to the clutch disengaged position, all of the fluid is not exhausted from the clutch chamber. Therefore, as the housing continues to rotate, centrifugal pressure builds up behind the clutch piston. The centrifugal pressure imparts a force on the clutch piston, and the force, if not counteracted, may cause the clutch to unintentionally move to the clutch engaged position.

One approach for counteracting this force includes providing a compensator chamber or balance chamber on a side of the clutch piston opposite the clutch chamber. The balance chamber is charged with low pressure lube oil, which is supplied by a pump, so as to build up a compensation pressure in the balance chamber.

Because the flow rate of lube oil is low and relatively constant, it may be difficult to maintain sufficient compensation pressure in the balance chamber during shift events. Furthermore, because lube oil is only fed to the balance chamber, a pressure differential typically develops between the balance chamber and the clutch chamber. This pressure differential results in a net static force acting on the clutch piston. During a shift event, higher pressure must then be developed in the clutch chamber in order to overcome the static force. As a result, fuel economy is reduced.

SUMMARY OF THE INVENTION

The invention addresses the shortcomings of the prior art by providing a clutch assembly and charging system combination for use with an automatic transmission. The combination includes a clutch assembly having a clutch that is movable between a clutch engaged position and a clutch disengaged position. The clutch assembly further includes a clutch piston that is engageable with the clutch for urging the clutch toward the clutch engaged position, a clutch piston chamber in fluid communication with one side of the clutch piston, and a compensator chamber in fluid communication with an opposite side of the clutch piston. The combination further includes a charging system having a fluid circuit that is in fluid communication with the clutch piston chamber and the compensator chamber. The fluid circuit is configured to receive exhaust oil from the transmission, and to charge the clutch piston chamber and the compensator chamber using the exhaust oil.

DESCRIPTION OF THE PREFERRED EMBODIMENT

Figure 1:
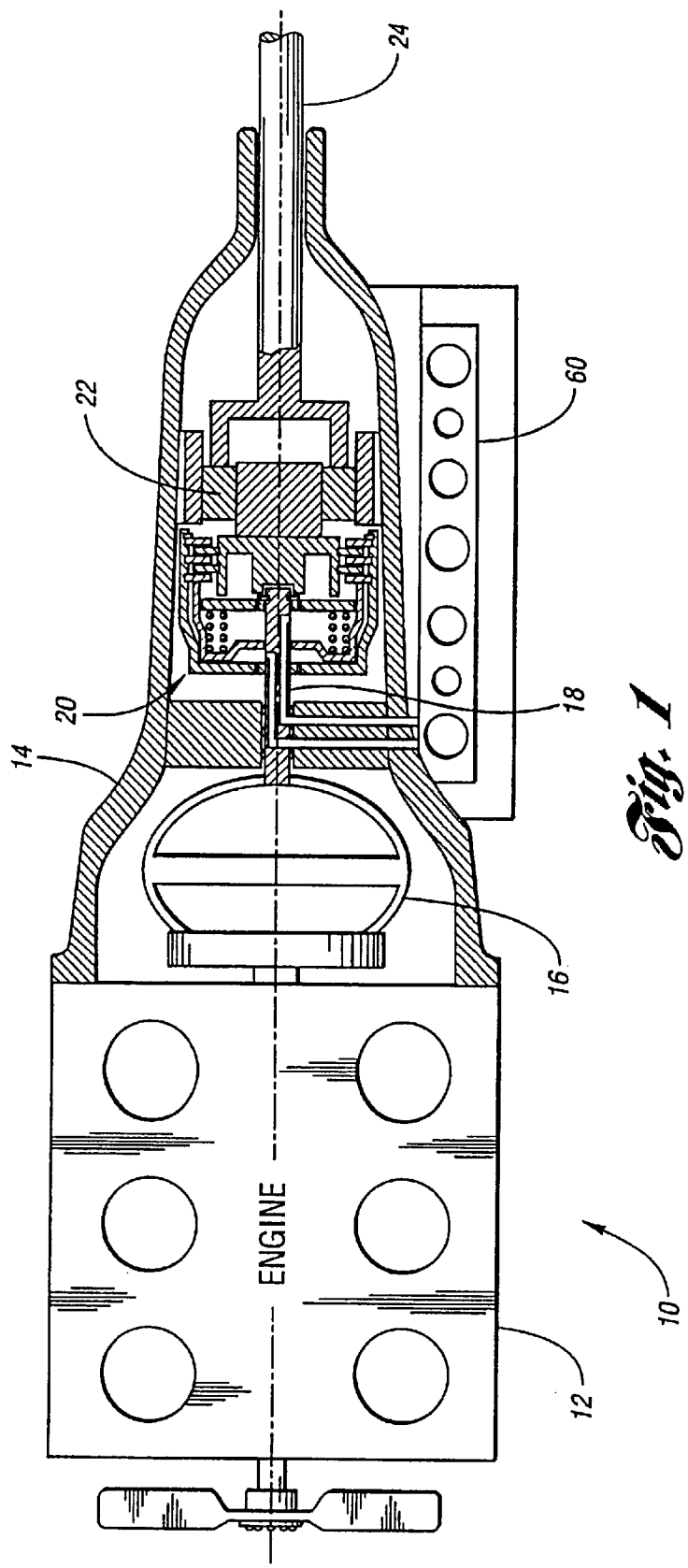
FIG. 1 is a schematic diagram of a powertrain including an engine and a transmission connected to the engine, wherein the transmission includes a clutch assembly and charging system combination according to the invention.

FIG. 1 shows a vehicle powertrain 10 including an engine 12 and an automatic transmission 14 that is connected to the engine 12 so as to receive power from the engine 12. The transmission 14 includes a torque converter 16 and a first shaft, such as an input shaft 18, connected to the torque converter 16. The transmission 14 further includes a clutch assembly and charging system combination 20, according to the invention, that is operative to transmit torque from the input shaft 18 through gearsets 22 to a second shaft, such as output shaft 24.

Figure 2:
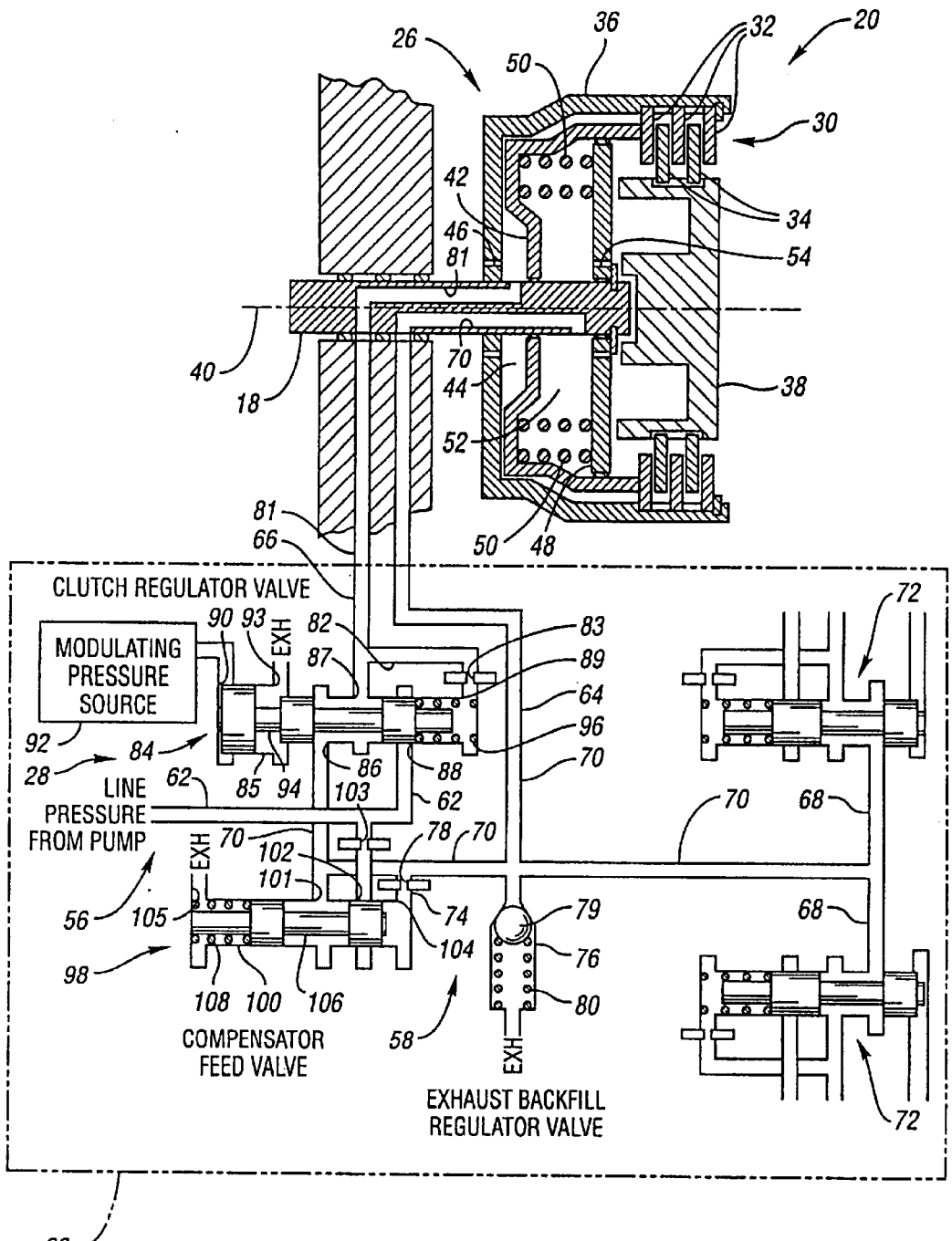
FIG. 2 is a schematic diagram of the combination showing a clutch of the combination in a clutch disengaged position.
Figure 3:
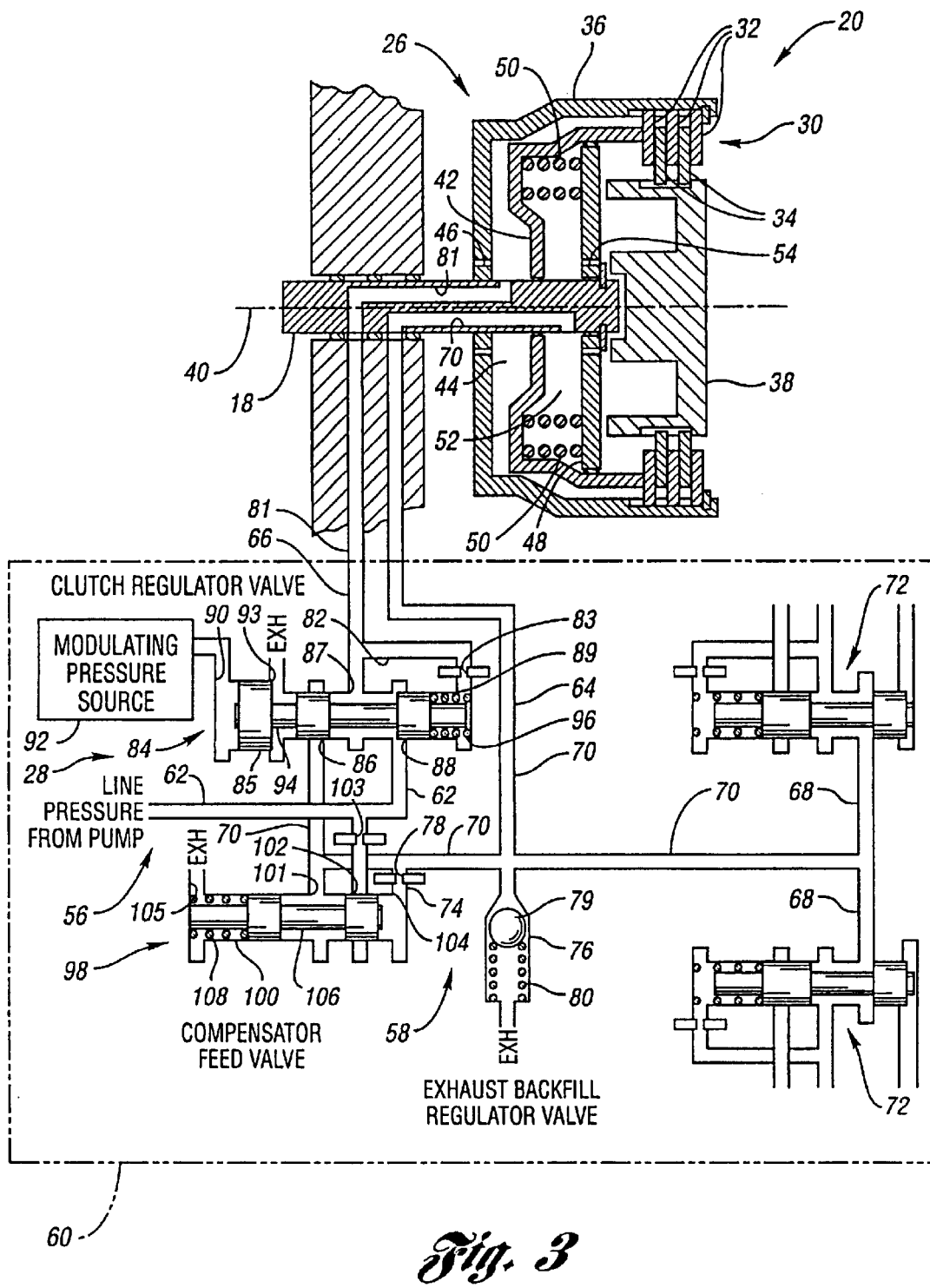
FIG. 3 is a schematic diagram of the combination showing the clutch in a clutch engaged position.
Figure 4:
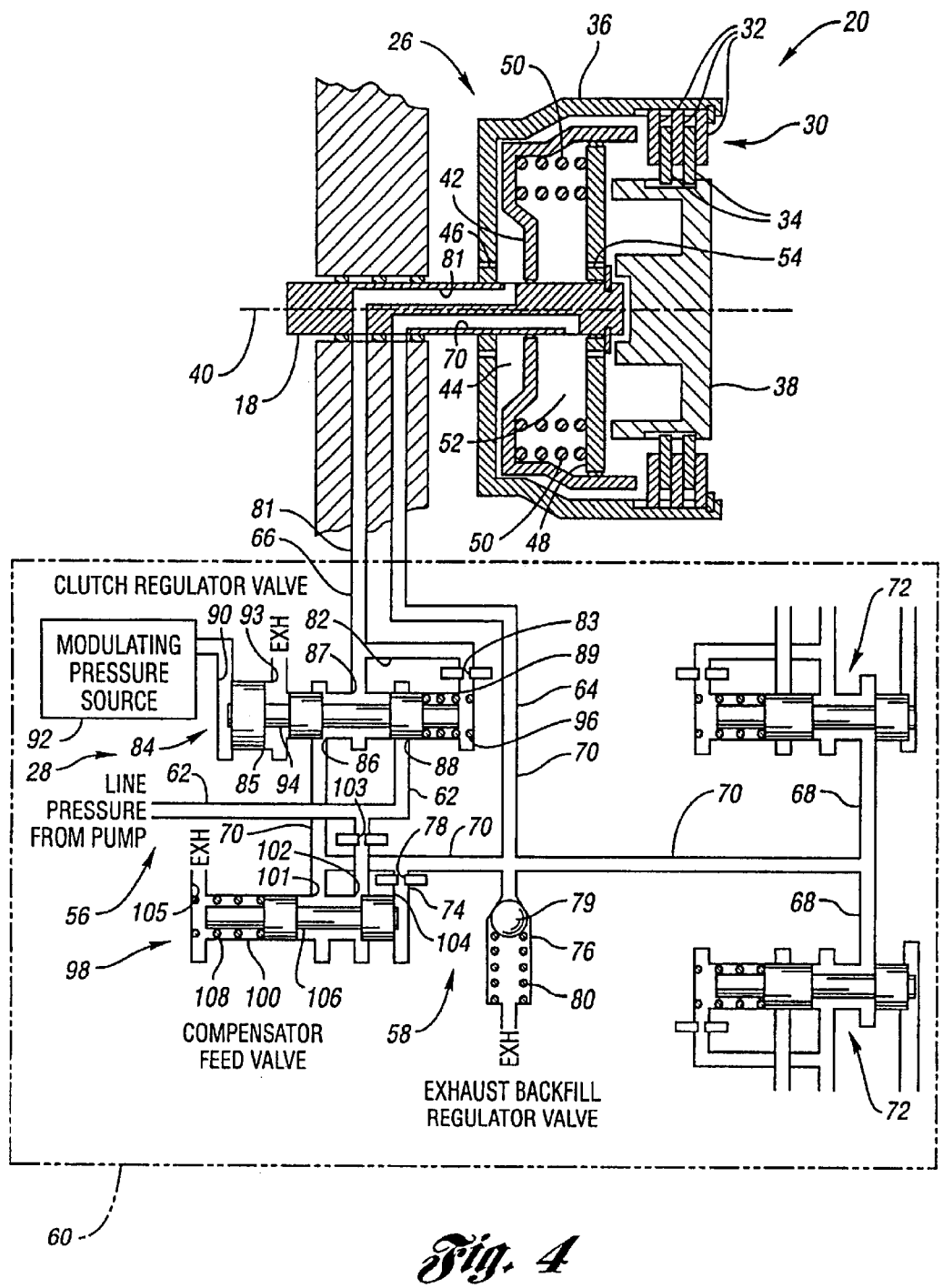
FIG. 4 is a schematic diagram of the combination showing a clutch piston of the combination disengaged from the clutch and moving toward a released position.

Referring to FIGS. 2 through 4, the combination 20 includes a clutch assembly 26 and a charging system 28 for supplying fluid to the clutch assembly 26, as explained below in detail. The clutch assembly 26 has a clutch pack or clutch 30 that is movable between a clutch disengaged position, shown in FIG. 2, and a clutch engaged position, shown in FIG. 3, in which plates of the clutch 30 are frictionally engaged with each other. More specifically, the clutch 30 includes reaction plates 32 and friction plates 34 that are separated from each other when the clutch 30 is in the disengaged position, and that are engaged with each other when the clutch 30 is in the clutch engaged position. The reaction plates 32 are splined or otherwise connected to an inside face of a clutch drum or housing 36, which is connected to the input shaft 18. The friction plates 34 are splined or otherwise connected to an outside face of a clutch hub 38, which is connected to the gearsets 22. Furthermore, the plates 32 and 34 are rotatable about an axis 40.

The clutch assembly 26 further includes a clutch piston 42 that is connected to the input shaft 18 such that the clutch piston 42 is axially movable between a first position or released position, shown in FIG. 2, and a second position or actuated position, shown in FIG. 3. When the clutch piston 42 is in the released position, the clutch piston 42 does not apply any significant axial force to the clutch 30 so that plates 32 and 34 may move axially and thereby separate from each other. When the clutch piston 42 moves toward the actuated position, the clutch piston 42 applies an axial force to the clutch 30 and urges the clutch 30 toward the clutch engaged position.

The clutch piston 42 also cooperates with the housing 36 to define a clutch piston chamber or clutch chamber 44 that receives fluid from the charging system 28, as explained below in greater detail. Furthermore, the housing 36 includes a clutch chamber bleed orifice 46 for allowing fluid, such as air and/or oil, to pass from the clutch chamber 44.

The clutch assembly 26 further includes a balance element, such as compensator element 48, and one or more return springs 50 disposed between the compensator element 48 and the clutch piston 42 for urging the clutch piston 42 toward the released position. The compensator element 48 is connected to the input shaft 18 such that the compensator element 48 is not axially movable with respect to the input shaft 18. Furthermore, the compensator element 48 cooperates with the clutch piston 42 to define a balance chamber or compensator chamber 52 that also receives fluid from the charging system 28. The compensator element 48 also includes a compensator chamber bleed orifice 54 for allowing fluid, such as air and/or oil, to pass from the compensator chamber 52.

The charging system 28 is configured to charge the clutch chamber 44, as well as the compensator chamber 52, and includes a high pressure passage arrangement 56 and a fluid circuit 58 connected to the high pressure passage arrangement 56. The high pressure passage arrangement 56 may be disposed at least partially in valve body 60 of transmission 14, and includes high pressure passages 62 that receive pressurized fluid, such as oil (which may also be referred to as transaxle fluid), from an oil pump (not shown). Furthermore, the high pressure passage arrangement 56 is configured to supply pressurized oil to the fluid circuit 58, as explained below in detail.

The fluid circuit 58 may also be disposed at least partially in valve body 60, and includes an exhaust backfill portion 64 in fluid communication with the compensator chamber 52, and a clutch feed portion 66 in fluid communication with the clutch chamber 44. The exhaust backfill portion 64 includes collection passages 68 that receive exhaust oil from the transmission 14, and one or more exhaust backfill passages 70 that are in fluid communication with the collection passages 68. Exhaust oil as used herein refers to non-pressurized or minimally pressurized oil [e.g., oil at a pressure in the range of 0 to 15 pounds per square inch gauge (psig)] that leaks from, or is otherwise exhausted from, one or more components of the transmission 14, such as various valves 72 disposed in the valve body 60. Instead of allowing all such exhaust oil to be returned to an oil pan or sump, as in prior systems, the exhaust backfill portion 64 enables the exhaust oil to be used for charging purposes.

The exhaust backfill portion 64 further includes a feedback passage 74 and an exhaust backfill regulator or control valve 76 that are each in fluid communication with the exhaust backfill passages 70. The feedback passage 74 has a metered orifice 78 for regulating the flow of fluid therethrough. The exhaust backfill control valve 76 is operative to regulate fluid pressure in the exhaust backfill passages 70, and includes a valve element, such as a ball 79, and a spring 80 engaged with the ball 79. Furthermore, the ball 79 is movable between a first or open position, shown in FIG. 3, and a second or closed position, shown in FIGS. 2 and 4.

The clutch feed portion 66 includes a clutch feed passage 81 and a feedback passage 82 in fluid communication with the clutch feed passage 81. In addition, the feed back passage 82 has a metered orifice 83 for regulating the flow of fluid therethrough.

The fluid circuit 58 further includes a clutch regulator valve 84 disposed between the exhaust backfill portion 64, the clutch feed portion 66 and the high pressure passage arrangement 56. The clutch regulator valve 84 includes a valve body 85 having an exhaust backfill port 86 connected to the exhaust backfill portion 64, a clutch feed port 87 connected to the clutch feed portion 66, and a high pressure port 88 connected to the high pressure passage arrangement 56. The valve body 85 further includes a feedback port 89 connected to feedback passage 82 of the clutch feed portion 66, a control port 90 connected to a modulating pressure source 92, and an exhaust port 93 for exhausting oil from the clutch regulator valve 84.

The clutch regulator valve 84 also includes a valve stem 94 that is movable between a first position, shown in FIG. 2, and a second position, shown in FIG. 3. Furthermore, a spring 96 is engaged with the valve stem 94 for urging the valve stem 94 toward the first position. When the clutch 30 is in the disengaged position and the valve stem 94 is in the first position, the clutch regulator valve 84 is operative to allow exhaust oil to flow from the exhaust backfill portion 64 to the clutch feed portion 66, as shown in FIG. 2. When the valve stem 94 is in the second position, the clutch regulator valve 84 is operative to allow high pressure oil to flow from the high pressure passage arrangement 56 to the clutch feed portion 66, while inhibiting or completely preventing flow from the exhaust backfill portion 64 to the clutch feed portion 66, so as to cause the clutch 30 to move to the clutch engaged position.

The fluid circuit 58 also includes a compensator feed valve 98 disposed between the exhaust backfill portion 64 and the high pressure passage arrangement 56. The compensator feed valve 98 includes a valve body 100 having an exhaust backfill port 101 connected to an exhaust backfill passage 70 of the exhaust backfill portion 64, and a high pressure port 102 connected to a metered orifice 103 of the high pressure passage arrangement 56. The valve body 100 further includes a feedback port 104 connected to feedback passage 74 of the exhaust backfill portion 64, and an exhaust port 105 for exhausting leakage oil from the compensator feed valve 98.

The compensator feed valve 98 also includes a valve stem 106 that is movable between a first position, shown in FIGS. 2 and 3, and a second position, shown in FIG. 4. Furthermore, a spring 108 is engaged with the valve stem 106 for urging the valve stem 106 toward the second position.

When pressure in the exhaust backfill portion 64 falls below a predetermined pressure, such as 3 psig, the valve stem 106 is urged toward the second position by spring 108. When the valve stem 106 is in the second position, the compensator feed valve 98 is operative to allow high pressure oil to flow from the high pressure passage arrangement 56 to the exhaust backfill portion 64. When the pressure in the exhaust backfill portion 64 rises above the predetermined pressure, the valve stem 106 is urged toward the first position by fluid pressure supplied to the feedback port 104. When the valve stem 106 is in the first position, the compensator feed valve 98 is operative to inhibit flow from the high pressure passage arrangement 56 to the exhaust backfill portion 64.

Referring to FIGS. 2 through 4, operation of the combination 20 will now be described in detail. When it is desirable to move the clutch 30 to the clutch engaged position so as to transfer torque from the housing 36 to the clutch hub 38, the modulating pressure source 92 may be activated by a transmission controller, for example, so as to provide pressurized fluid to the control port 90 of the clutch regulator valve 84. The pressurized fluid urges the valve stem 94 toward the second position, shown in FIG. 3, so that high pressure oil may flow from the high pressure passage arrangement 56 to the clutch feed portion 66. High pressure oil then flows from the clutch feed portion 66 to the clutch chamber 44 so as to move the clutch piston 42 to the actuated position, thereby moving the clutch 30 to the clutch engaged position.

As the clutch piston 42 moves toward the actuated position, shown in FIG. 3, oil and/or air may pass from the compensator chamber 52 through the exhaust backfill portion 64 and out the exhaust backfill control valve 76. Oil and/or air may also bleed through the compensator bleed orifice 54. Such bleed oil may be used for lubrication and cooling of the plates 32 and 34, as well as other transmission components.

When the modulating pressure source 92 is deactivated such that the pressure at control port 90 is approximately 0 psig, the spring 96 of the clutch regulator valve 84 returns the valve stem 94 to the first position shown in FIG. 2. The return springs 50 then urge the clutch piston 42 toward the released position, thereby allowing the clutch 30 to move to the clutch disengaged position. As the clutch piston 42 moves toward the released position, oil and/or air may pass from the clutch chamber 44, through the clutch feed portion 66 and exhaust backfill portion 64, and out the exhaust backfill control valve 76. Air and/or oil may also pass from the clutch chamber 44 through the clutch bleed orifice 46.

When the clutch 30 is in the clutch disengaged position and the clutch piston 42 is in the released position, the fluid circuit 58 charges both the clutch chamber 44 and the compensator chamber 52 so as to inhibit the clutch piston 42 from returning to the actuated position. Under most conditions, the fluid circuit 58 may charge the chambers 44 and 52 only with exhaust oil that is collected by the collection passages 68. For example, the flow of exhaust oil may be sufficient to maintain the fluid circuit 58 at a charge pressure in the range of 3 to 5 psig.

Under some conditions, such as immediately after a shift event when the clutch piston 42 is moving toward the released position, as shown in FIG. 4, there may not be sufficient flow of exhaust oil into the collection passages 68 to maintain the fluid circuit 58 at a desired charge pressure or charge pressure range. In such a case, the compensator feed valve 98 may allow oil to flow from the high pressure passage arrangement 56 to the exhaust backfill portion 64. For example, the spring 108 of the compensator feed valve 98 may be configured to urge the valve stem 106 toward the second position when the fluid pressure in the exhaust backfill portion 64 falls below a predetermined pressure, such as 3 psig. When the fluid pressure in the exhaust backfill portion 64 rises above the predetermined pressure, the compensator feed valve 98 may inhibit or completely prevent flow of oil from the high pressure passage arrangement 56 to the exhaust backfill portion 64. Furthermore, the exhaust backfill control valve 76 may be configured to open and release oil from the exhaust backfill portion 64 if the fluid pressure rises above a maximum pressure, such as 5 psig. With such a configuration, fluid pressure in the exhaust backfill portion 64 may be maintained within a suitable range, such as 3 to 5 psig, during all operating conditions. As a result, shift consistency is improved.

Advantageously, the exhaust backfill control valve 76 also inhibits loss of clutch capacity if the compensator feed valve 98 sticks in the second position. In other words, if the valve stem 106 sticks in the second position such that high pressure oil is continuously supplied to the exhaust backfill portion 64, the exhaust backfill control valve 76 will operate to maintain fluid pressure in the exhaust backfill portion 64 below a predetermined maximum pressure, such as 5 psig, so that the clutch 30 may still move to the clutch engaged position. The metered orifice 103 of the high pressure passage arrangement 56 may also be appropriately sized in order to provide enough supplemental flow for transient events, but limit the amount of flow that must be exhausted by the exhaust backfill control valve 76 in the event the valve stem 106 sticks in the second position.

Because the fluid circuit 58 may use exhaust oil to charge the chambers 44 and 52 when the clutch 30 is in the clutch disengaged position, additional flow from the oil pump may not be required to charge the fluid circuit 58. As a result, the size of the oil pump may be reduced.

Furthermore, because the fluid circuit 58 charges both chambers 44 and 52 to the same pressure when the clutch 30 is in the clutch disengaged position, there is a zero net force acting on the clutch piston 42. As a result, the return springs 50 may be reduced in size compared with return springs in prior clutch assemblies. Furthermore, shift consistency may be improved.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for charging a clutch assembly of a transmission, the clutch assembly including a clutch that is movable between a clutch engaged position and a clutch disengaged position, a clutch piston that is engageable with the clutch for urging the clutch toward the clutch engaged position, a clutch piston chamber in fluid communication with one side of the clutch piston, and a compensator chamber in fluid communication with an opposite side of the clutch piston, the system comprising:

a fluid circuit that is adapted to be connected to the clutch piston chamber and the compensator chamber, the fluid circuit being configured to receive exhaust oil from the transmission, and to charge the clutch piston chamber and the compensator chamber using the exhaust oil.

2. The system of claim 1 further comprising a high pressure passage arrangement connected to the fluid circuit for supplying high pressure oil to the fluid circuit.

3. The system of claim 2 wherein the fluid circuit includes an exhaust backfill portion adapted to be in fluid communication with the compensator chamber, and a clutch feed portion adapted to be in fluid communication with the clutch piston chamber, the exhaust backfill portion further being adapted to receive the exhaust oil from the transmission.

4. The system of claim 3 wherein the fluid circuit includes a clutch regulator valve connected to the exhaust backfill portion, the clutch feed portion and the high pressure passage arrangement, the clutch regulator valve being operative to allow exhaust oil to flow from the exhaust backfill portion to the clutch feed portion when the clutch is in the clutch disengaged position, and the clutch regulator valve further being operative to allow high pressure oil to flow from the high pressure passage arrangement to the clutch feed portion, while inhibiting flow from the exhaust backfill portion to the clutch feed portion, so as to cause the clutch to move to the clutch engaged position.

5. The system of claim 3 wherein the fluid circuit further includes a compensator feed valve connected between the exhaust backfill portion and the high pressure passage arrangement, the compensator feed valve being operative to allow high pressure oil to flow from the high pressure passage arrangement to the exhaust backfill portion when pressure in the exhaust backfill portion falls below a predetermined pressure, and the compensator feed valve further being operative to inhibit flow from the high pressure passage arrangement to the exhaust backfill portion when the pressure in the exhaust backfill portion rises above the predetermined pressure.

6. The system of claim 3 wherein the exhaust backfill portion includes a control valve for regulating fluid pressure in the exhaust backfill portion.

7. A clutch assembly and charging system combination for use with an automatic transmission, the combination comprising:

a clutch assembly having a clutch that is movable between a clutch engaged position and a clutch disengaged position, a clutch piston that is engageable with the clutch for urging the clutch toward the clutch engaged position, a clutch piston chamber in fluid communication with one side of the clutch piston, and a compensator chamber in fluid communication with an opposite side of the clutch piston;

a charging system including a fluid circuit that is in fluid communication with the clutch piston chamber and the compensator chamber, the fluid circuit being configured to receive exhaust oil from the transmission, and to charge the clutch piston chamber and the compensator chamber using the exhaust oil.

8. The combination of claim 7 wherein the charging system further includes a high pressure passage arrangement connected to the fluid circuit for supplying high pressure oil to the fluid circuit.

9. The combination of claim 8 wherein the fluid circuit includes an exhaust backfill portion in fluid communication with the compensator chamber, and a clutch feed portion in fluid communication with the clutch piston chamber, the exhaust backfill portion further being adapted to receive the exhaust oil from the transmission.

10. The combination of claim 9 wherein the fluid circuit includes a clutch regulator valve connected to the exhaust backfill portion, the clutch feed portion and the high pressure passage arrangement, the clutch regulator valve being operative to allow exhaust oil to flow from the exhaust backfill portion to the clutch feed portion when the clutch is in the clutch disengaged position, and the clutch regulator valve further being operative to allow high pressure oil to flow from the high pressure passage arrangement to the clutch feed portion, while inhibiting flow from the exhaust backfill portion to the clutch feed portion, so as to cause the clutch to move to the clutch engaged position.

11. The combination of claim 9 wherein the fluid circuit further includes a compensator feed valve connected between the exhaust backfill portion and the high pressure passage arrangement, the compensator feed valve being operative to allow high pressure oil to flow from the high pressure passage arrangement to the exhaust backfill portion when pressure in the exhaust backfill portion falls below a predetermined pressure, and the compensator feed valve further being operative to inhibit flow from the high pressure passage arrangement to the exhaust backfill portion when the pressure in the exhaust backfill portion rises above the predetermined pressure.

12. The combination of claim 9 wherein the exhaust backfill portion includes a control valve for regulating fluid pressure in the exhaust backfill portion.

13. The combination of claim 7 wherein the clutch assembly further includes a compensator element in fluid communication with the compensator chamber, the compensator element having a bleed orifice for allowing fluid to pass from the compensator chamber.

14. The combination of claim 7 wherein the clutch assembly further includes a housing that houses the clutch piston and cooperates with the clutch piston to define the clutch piston chamber, the housing including a bleed orifice for allowing fluid to pass from the clutch piston chamber.

15. A clutch assembly and charging system combination for use with a vehicle automatic transmission, the combination comprising:

a clutch assembly having a clutch that is movable between a clutch engaged position and a clutch disengaged position, a clutch piston that is engageable with the clutch for urging the clutch toward the clutch engaged position, a clutch piston chamber in fluid communication with one side of the clutch piston, and a compensator chamber in fluid communication with an opposite side of the clutch piston;

a charging system for charging the clutch piston chamber and the compensator chamber, the charging system including a fluid circuit and a high pressure passage arrangement for supplying high pressure oil to the fluid circuit, the fluid circuit including an exhaust backfill portion in fluid communication with the compensator chamber, and a clutch feed portion in fluid communication with the clutch piston chamber, the exhaust backfill portion being adapted to receive exhaust oil from the transmission, the fluid circuit further including a clutch regulator valve disposed between the exhaust backfill portion, the clutch feed portion and the high pressure passage arrangement, and a compensator feed valve disposed between the exhaust backfill portion and the high pressure passage arrangement, the clutch regulator valve being operative to allow exhaust oil to flow from the exhaust backfill portion to the clutch feed portion when the clutch is in the clutch disengaged position, the clutch regulator valve further being operative to allow high pressure oil to flow from the high pressure passage arrangement to the clutch feed portion, while inhibiting flow from the exhaust backfill portion to the clutch feed portion, so as to cause the clutch to move to the clutch engaged position, the compensator feed valve being operative to allow high pressure oil to flow from the high pressure passage arrangement to the exhaust backfill portion when pressure in the exhaust backfill portion falls below a predetermined pressure, and the compensator feed valve further being operative to inhibit flow from the high pressure passage arrangement to the exhaust backfill portion when the pressure in the exhaust backfill portion rises above the predetermined pressure.

* * * * *